June 15, 1926.  E. R. BARRETT  1,589,093
POWER TAKE-OFF MECHANISM
Filed Sept. 22, 1924    2 Sheets-Sheet 2

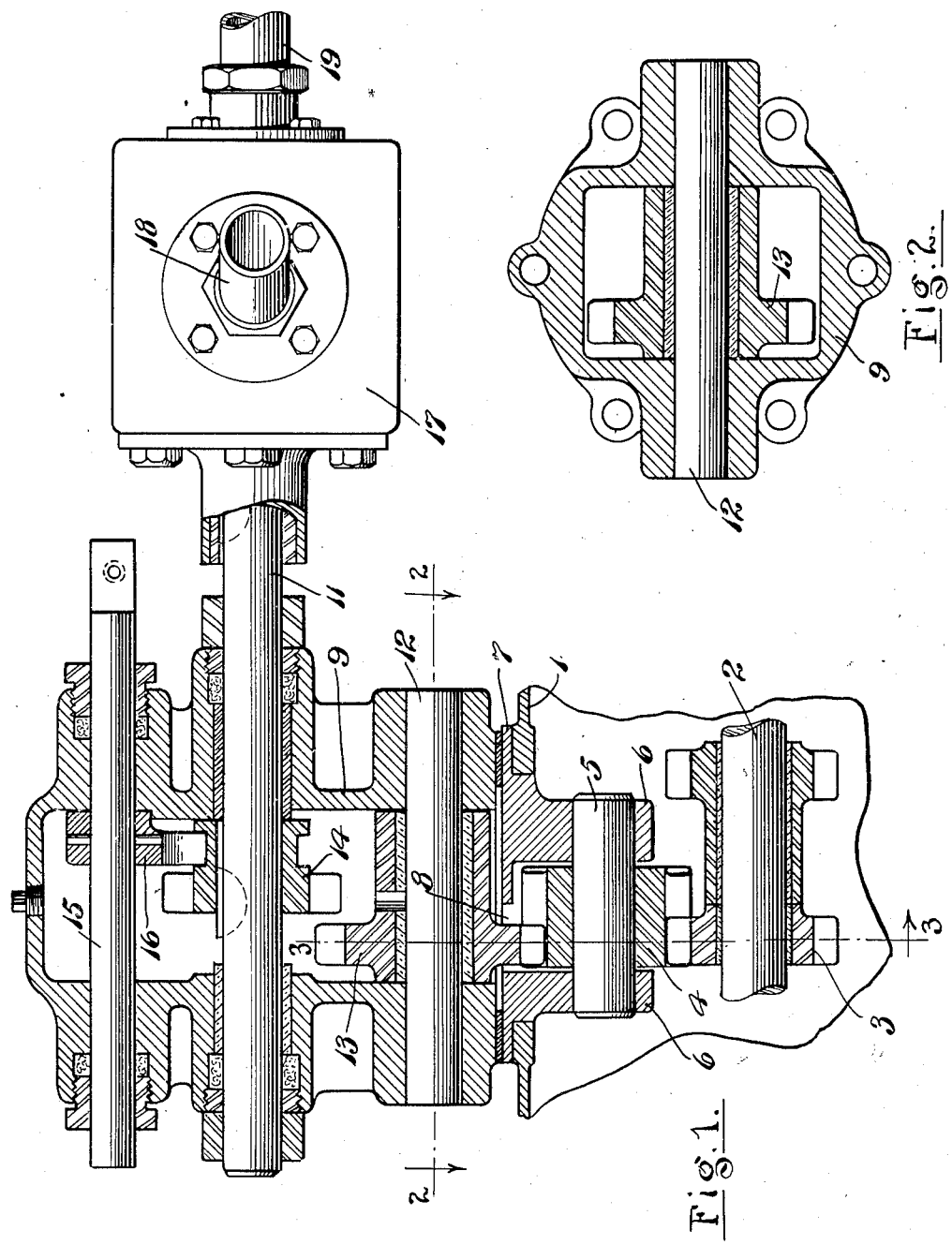

Inventor
Edward R. Barrett
By Frank E. Liverance, Jr.
Attorney.

Patented June 15, 1926.

1,589,093

UNITED STATES PATENT OFFICE.

EDWARD R. BARRETT, OF DETROIT, MICHIGAN, ASSIGNOR TO WOOD HYDRAULIC HOIST AND BODY COMPANY, OF DETROIT, MICHIGAN, A CORPORATION OF MICHIGAN.

POWER TAKE-OFF MECHANISM.

Application filed September 22, 1924. Serial No. 738,985.

This invention relates to a power take-off adapted to be applied to a transmission gearing of the selective speed type such as is used in motor vehicles, and the present invention is directed to novel mechanism and construction whereby a pump for pumping oil to a body dumping hoist may be operated from the transmission gearing, the engine driving the gearing so that the pump is directly driven by the engine in service.

The present invention is designed to take advantage of a well known and standard type of transmission gearing, the power take-off being applied at one side of the casing for the gearing and connection being made with the reverse idler of the gearing; it being necessary only to machine a single hole through the transmission casing and then attach the power take-off device to complete the installation. This makes a very simple and effective power take-off and one very durable and efficient for the purposes which it is to serve.

For an understanding of the invention, reference may be had to the following description, taken in connection with the accompanying drawings, in which, Fig. 1 is a fragmentary horizontal section through the power take-off device and an adjacent part of the transmission.

Fig. 2 is a vertical section taken substantially on the plane of line 2—2, of Fig. 1.

Like reference characters refer to like parts in the different figures of the drawings.

Figure 4:
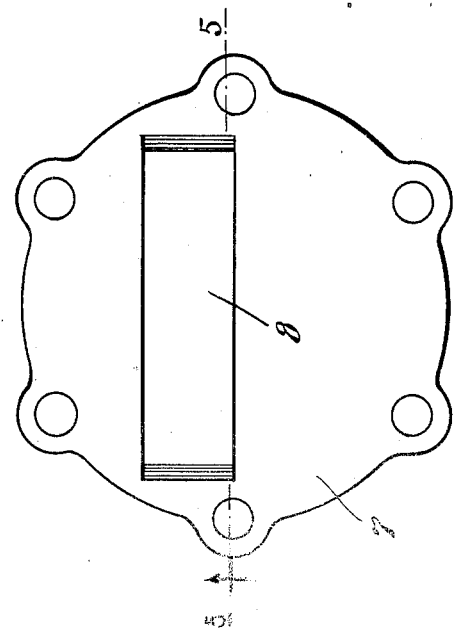
Fig. 4 is a plan view of the member which carries the reverse idler pinion.
Figure 5:
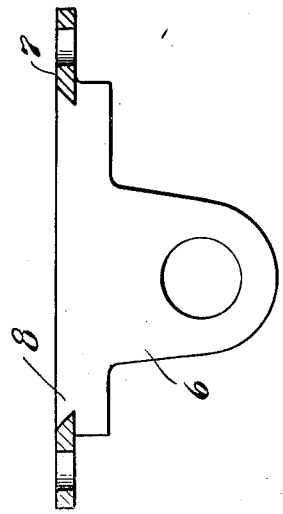
Fig. 5 is a section taken on the plane of line 5—5, of Fig. 4.
Figure 3:
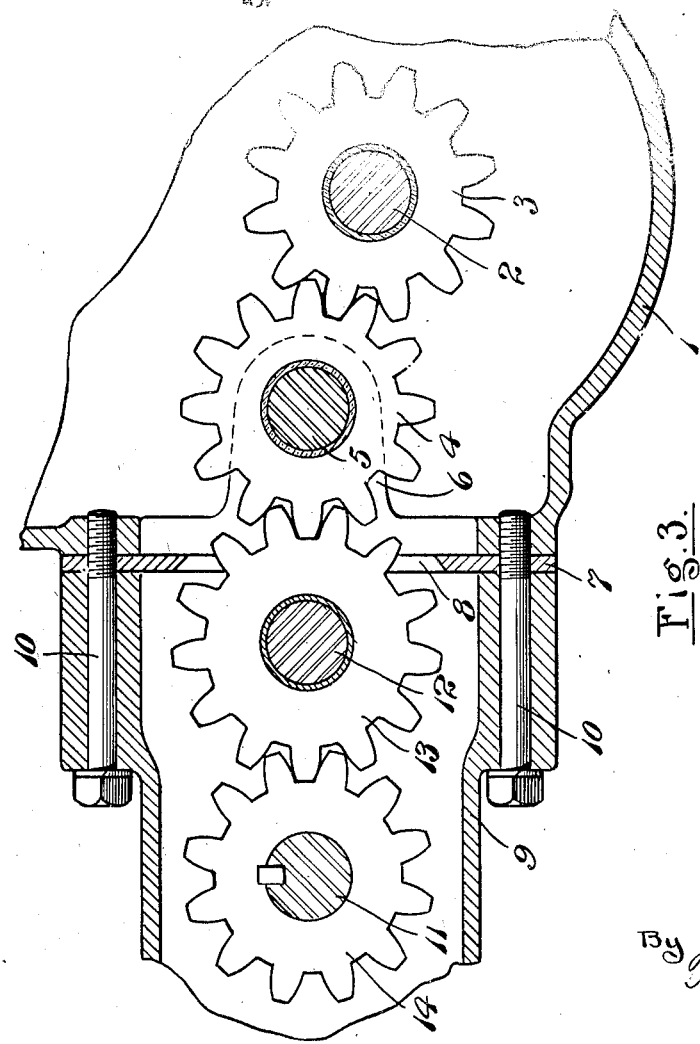
Fig. 3 is a vertical section taken on the plane of line 3—3, of Fig. 1.

The transmission gearing is enclosed in a suitable casing 1 and includes a counter shaft 2 on which the shiftable gears, one of which is shown at 3, are mounted. This gear or pinion 3 is adapted to be moved into mesh with the reverse idler pinion 4 which is rotatably mounted on a short shaft carried by and between two spaced apart ears or lugs 6 cast integral with and projecting from a base 7. An opening is made through a side of the transmission casing 1 and the ears or lugs inserted therethrough, the base 7 completely closing the opening and extending at its edges beyond the opening. This is an old type of transmission gearing and in practice the plate 7 is secured to the side of the transmission casing by set screws passed through the openings adjacent the edges of the plate as shown in Fig. 4.

When the power take-off of my invention is applied, an elongated opening 8 is machined through the plate adjacent the pinion 4. The power take-off includes a number of shafts and pinions housed in a suitable casing 9 which is secured to the side of the transmission casing by bolts and set screws 10 which also pass through the openings described in plate 7, thereby securing the plate between the transmission and power take-off casings. Two shafts 11 and 12 are rotatably mounted in the casing 9, the latter having a gear 13 rotatably mounted thereon which extends through the opening 8 in plate 7 so as to engage with the idler reverse pinion 4. On the shaft 11 a sliding gear 14 is splined and is adapted to be moved into or out of mesh with the gear 13. A shifter rod is slidably mounted parallel to the shaft 11, as indicated at 15 to which a yoke 16 within the casing 9 is permanently connected, the yoke engaging with the gear 14 so that it may be shifted on the shaft 11 with the movements of the shifter rod. Any suitable means may be used for the manual operation of the shifter rod.

Shaft 11 extends through and a distance beyond the casing 9 at one end and serves to drive a pump of the gear type or like that shown in United States Patent No. 1,271,968, issued July 9, 1918, to Garfield A. Wood. This pump is housed in the housing 17 into which shaft 11 passes to drive the pump and there are suitable conduits 18 and 19 for carrying the liquid, usually oil, which is used and which in practice is used to operate hydraulic hoisting devices to tilt dumping bodies mounted on trucks or like motor vehicles.

With the transmission gearing in neutral, no connection is made between the engine and the rear axle of the vehicle. But the pinions on the counter shaft 2 are rotated and the reverse idler pinion 4 is driven under such conditions, this causing gear 13 to be rotated continuously so long as the engine is running. To cause the pump to be driven it is merely necessary to operate the shifter rod 15 to move gear 14 into engagement with the gear 13, whereupon the pump will be continuously driven.

The construction described is very effective in operation and exceptionally simple to install on the transmission casing, the only machining necessary being to cut the opening 8 in the base plate 7 of the transmission casing. When this is done, the power take-off mechanism can be installed by simply properly placing its casing and inserting the connecting set screws or bolts 10, whereupon the installation is complete, the plate 7 and attached idler pinion being secured and properly positioned with the attachment of the power take-off casing. The construction is durable and fully capable of withstanding the severe service required of it. The appended claims define the invention which is to be considered as comprehensive of all forms of construction coming within their scope.

I claim:

1. In combination, a transmission casing having an opening in a side thereof, a base plate provided with two spaced ears, said ears being inserted through the opening in the casing, a pinion rotatably mounted between said ears and adapted to be driven by said transmission gearing, said base plate having an opening made therethrough, a gear casing located against said base plate, means for securing the gear casing to the transmission casing with the base plate interposed between, two shafts mounted in said gear casing, a gear on one shaft extending through the opening in said base plate and meshing with said pinion, a second gear splined on the second shaft, a shifter rod slidably mounted in said gear casing, and a yoke attached to the rod and operatively connected with the second gear for slidably moving the same on reciprocation of the rod to move the second gear into or out of engagement with the first gear, substantially as described.

2. In combination, a transmission gearing casing having an opening in a side thereof, a plate provided with two spaced apart ears, said ears being inserted through the opening into the casing, a reverse idler pinion rotatably mounted between the ears and adapted to be driven by said transmission gearing, said plate having an opening made therethrough between the ears, a second gear casing located against the plate, means for securing the second gear casing to the transmission gearing casing with the plate disposed therebetween, two shafts mounted in the second gear casing, a gear on one of the shafts extending through the opening in the plate and meshing with said idler pinion, a second gear splined on the other shaft, and means for moving the second gear on its shaft to bring it into and out of engagement with the first gear, substantially as described.

3. In combination, a transmission casing having gears therein and an opening in a side thereof, a base plate to cover said opening and having an opening through it, a pinion rotatably mounted on said base plate and located within said transmission casing and meshing with a gear therein, a power take-off gear casing located against said base plate, means for securing said power take-off gear casing to the transmission casing with the base plate betwen them, and a gear in the power take-off gear casing extending through the opening in the base plate and meshing with the pinion mounted on the base plate.

4. In combination, a transmission casing having an opening in one side thereof and gears therein, and a power take-off mechanism located adjacent said opening and having a pinion extending through said opening and meshing with a gear in the transmission casing, an intermediate gear in the power take-off mechanism meshing with said pinion, a power shaft, a gear slidably mounted on said power shaft and means for sliding said gear on said shaft into or out of mesh with said intermediate gear.

In testimony whereof I affix my signature.

EDWARD R. BARRETT.